United States Patent [19]

Sims

[11] 4,210,308
[45] Jul. 1, 1980

[54] VALVE

[76] Inventor: James O. Sims, Rte. 2, Box 248, Hartselle, Ala. 35640

[21] Appl. No.: 927,499

[22] Filed: Jul. 24, 1978

[51] Int. Cl.² .................. F16K 3/02; F16K 31/122
[52] U.S. Cl. .................... 251/31; 251/328; 251/329; 251/367; 251/154
[58] Field of Search ............. 251/327, 326, 328, 31, 251/367, 329, 154

[56] References Cited

U.S. PATENT DOCUMENTS

| | | | |
|---|---|---|---|
| 2,816,730 | 12/1957 | Rabas | 251/328 |
| 2,913,220 | 11/1959 | Cover | 251/327 X |
| 3,190,302 | 6/1965 | Volpin | 251/327 X |
| 3,936,031 | 2/1976 | Berman et al. | 251/327 X |
| 4,010,928 | 3/1977 | Smith | 251/327 X |

FOREIGN PATENT DOCUMENTS 718329  11/1954  United Kingdom ............... 251/328

Primary Examiner—Arnold Rosenthal
Attorney, Agent, or Firm—C. A. Phillips

[57] ABSTRACT

A valve in which a blade having an opening is moved between two oval-shaped seals, each having a pair of spaced circular inner seals, all housed in a valve body. One set of aligned circular seals has a central opening flanked by two opposing and aligned openings through the valve body. When the opening of the blade is positioned in alignment with the opening through the seals and the body, the valve is, of course, opened. When the opening of the blade is repositioned opposite the other set of o-shaped seals, the valve is very tightly closed.

9 Claims, 10 Drawing Figures

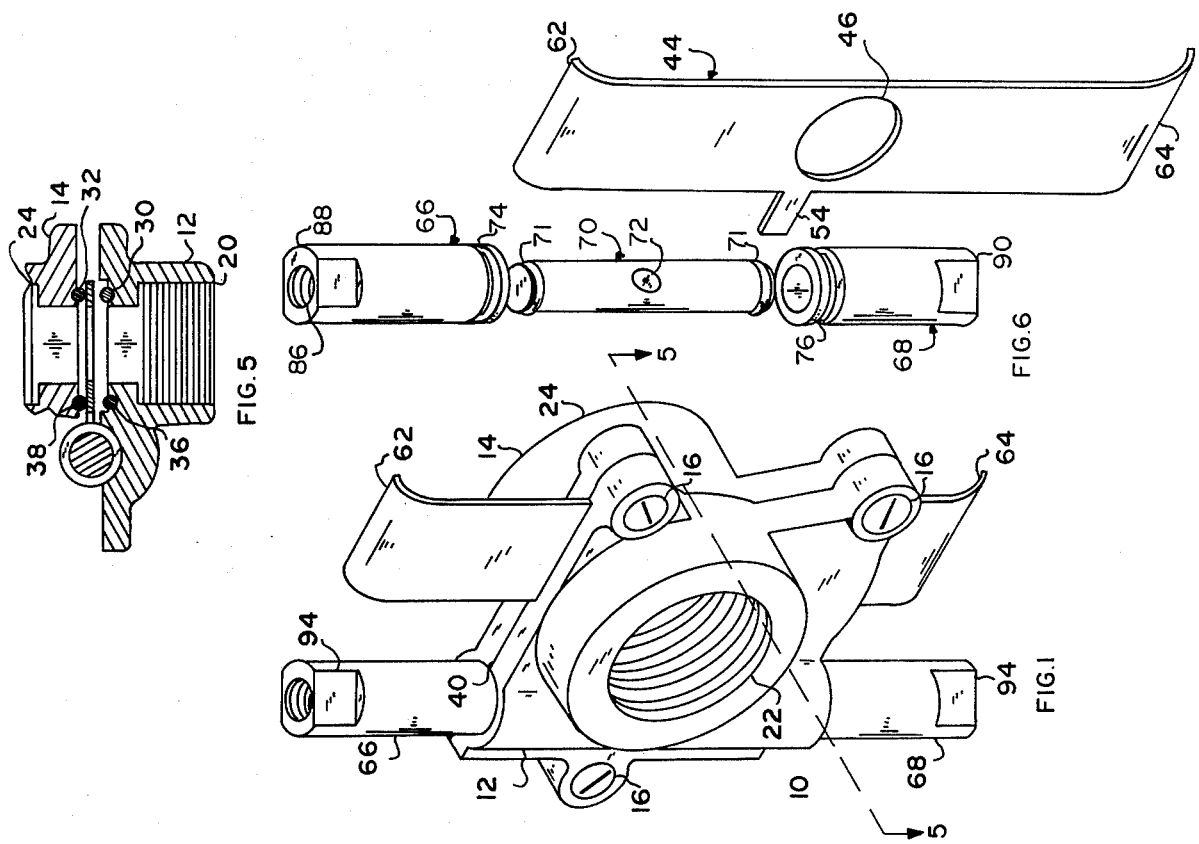
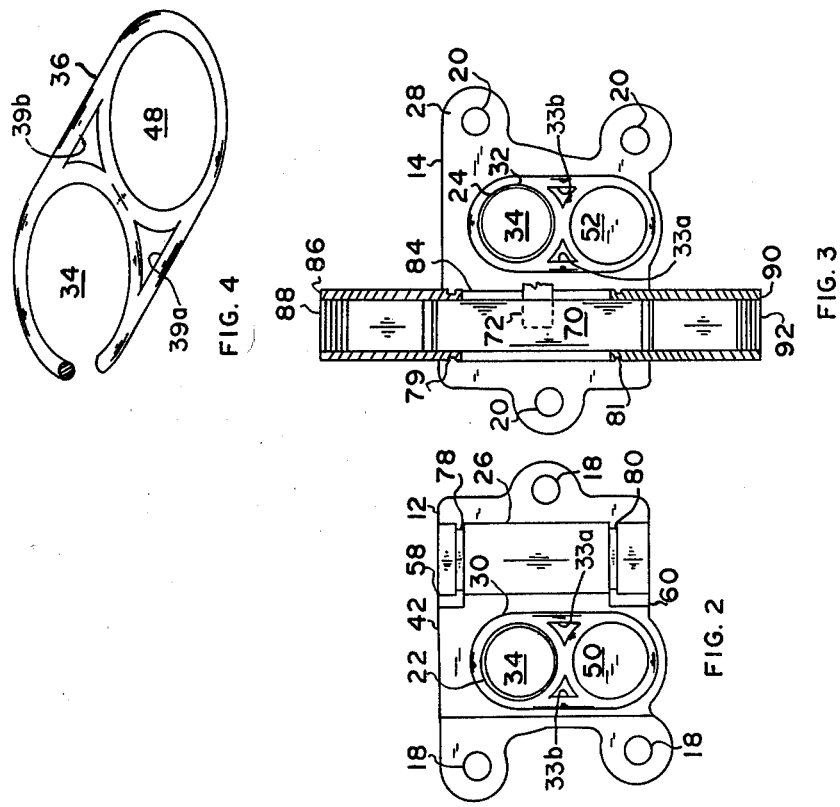

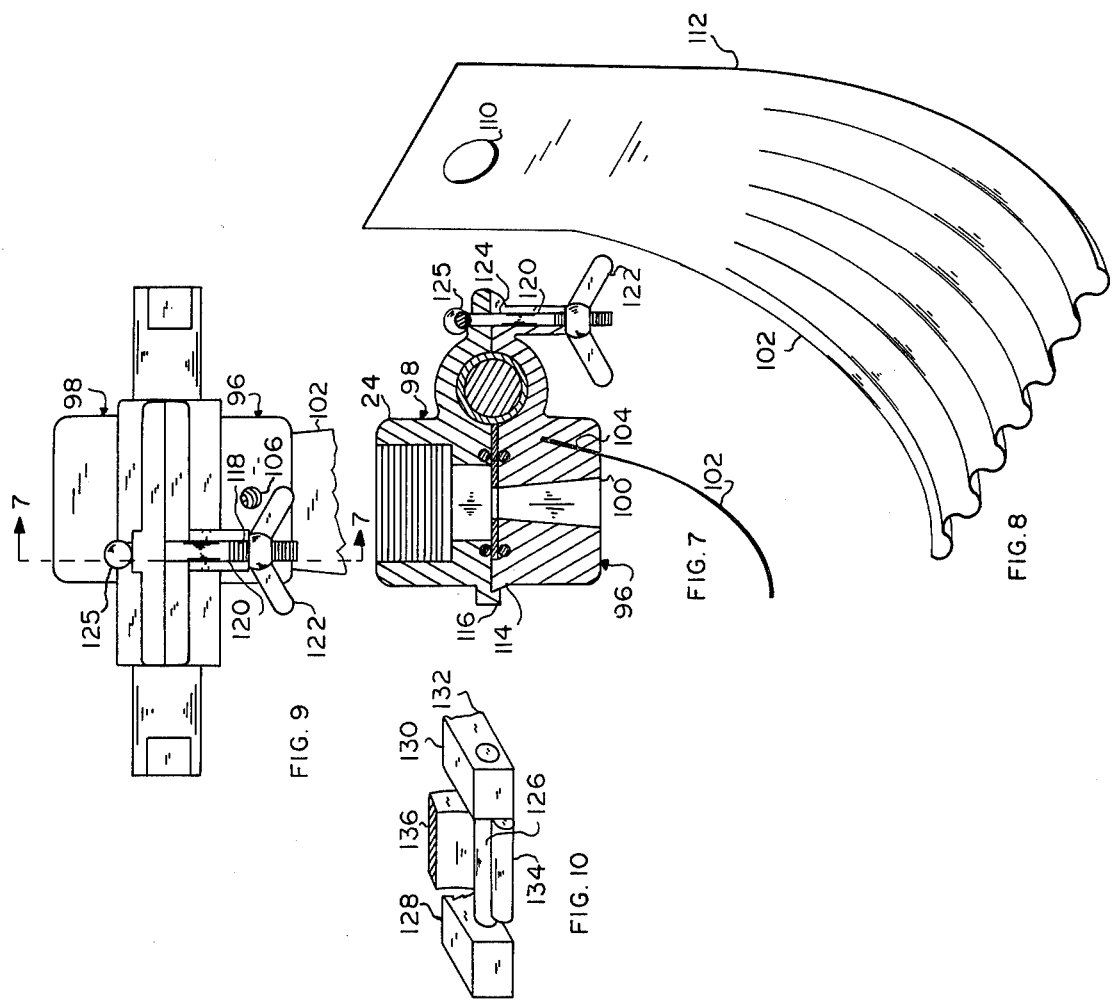

VALVE

BACKGROUND OF THE INVENTION

1. Field of the Invention

This invention relates to valves for controlling liquid flow, and particularly to a new and improved valve which may be either manually or fluid (e.g., hydraulically) operated.

2. General Description of the Prior Art

All valves employ some form of element which operates either linearly or in a rotary fashion to impinge on, and finally close, an element orifice. When in an open state, the element, e.g., a ball with an opening aligned in the direction of flow, or some form of gate which is retracted to the side of the orifice, all tend to be effected by the material passing through the valve. In the case of pot ash, sulfur solution, and a number of others, the effect is that there is a build-up of material on the valving element which adversely affects operation in two respects. One, it tends to reduce the size of effective orifice, thus flow performance is impaired; and two, build-ups tend to prevent complete valve closure. More generally, existing valves have certain other well recognized problems, at least for certain operations. For example, they are often too bulky for location in confined spaces. Second, being large, they are often quite costly. And third, they are often difficult and expensive to remotely control. For example, the operation of a ball valve or butterfly valve requires a crank attached to the valve and a hydraulic cylinder positioned significantly outboard of the valve to operate the crank.

Accordingly, it is an object of this invention to provide a new and improved valve which eliminates the build-up problem, is extremely compact, and includes built-in means for remote control.

SUMMARY OF THE INVENTION

In accordance with this invention, a valve body is constructed having axially aligned entry and exit passageways, and wherein a blade having an orifice is movably interposed between the entry and exit passageways, being slidably held by a pair of generally figure 8-shaped seals (preferably rounded, but may be box-shaped). The blade is in an "on" position when its orifice is in alignment with the entry and exit passageways, which are connected through one of the aligned "o's" of the oval seals. A pair of spaced, generall "o" sealing rims are interior of the outer edge of the seal. The valve is closed by moving the blade to a position where the blade surface blocks and closes the exit and entry passageways while the orifice is sealed between the other pair of aligned and closed "o's" of the seals. Alternately, different size openings may be provided in the "o's" to effect different rates of flow rather than an "off-on" function. The blade may be operated manually or hydraulically, and as a particular feature of this invention, a compact hydraulic system is provided wherein a piston is directly connected to the blade of the valve and a piston slidably contained within two opposing hydraulically powered cylinders which are fitted within cavities of the valve body.

BRIEF DESCRIPTION OF THE DRAWINGS

FIG. 1 is a pictorial view of an embodiment of the invention.

FIG. 2 is an interior view of one-half of the valve body as contemplated by the invention.

FIG. 3 is an interior view of an opposite body half, together with certain other components shown in broken-away form.

FIG. 4 is a pictorial view of one of two identical seals.

FIG. 5 is a partial sectional view of the embodiment shown along lines 5—5 of FIG. 1.

FIG. 6 is an exploded pictorial view of the hydraulic components and orificed blade as contemplated by the invention.

FIG. 7 is a sectional view along lines 7—7 of FIG. 7 of the embodiment shown in FIG. 7.

FIG. 8 is an enlarged pictorial view of a spray deflector shown in FIG. 7.

FIG. 9 is a side view of an alternate form of the invention.

FIG. 10 is a broken pictorial view of an alternate form for certain of the fasteners shown in FIGS. 7 and 9.

DETAILED DESCRIPTION OF THE DRAWINGS

Referring initially to FIGS. 1, 2, and 3, valve body 10 is formed of basically identical valve body members 12 and 14, fastened together by screws 16 which pass through appropriately sized screw openings 18 in valve body member 12, and which tighten in threads in openings 20 of valve body member 14. Valve body members 12 and 14 have identical and axially aligned threaded fluid openings, openings 22 and 24, respectively. Valve operation is effected in a central region between valve body members wherein each has a planar surface, being planar surface 26 of body member 12 and planar surface 28 of body member 14. Each of these surfaces have identically positioned grooves, being groove 30 of body member 12 and groove 32 of body member 14. Groove 32 of body member 14 has a generally oval-shaped outer edge and two inner o-shaped edges 34 and 52 spaced along the longitudinal dimension of oval-shaped groove 32. Similarly, groove 30 of body member 12 has a generally oval-shaped outer edge and two inner o-shaped inner edges 34 and 52 spaced along the longitudinal dimension of groove 30. In each case, the grooves, grooves 30 and 32, are interrupted by triangular non-groove regions 33a and 33b positioned between o-shaped edges just inboard of the outer edges of the groove and off center of the longitudinal axis of each groove. This is illustrated in FIGS. 2 and 3.

Identical shaped rubber seals conform to and fit within the grooves shown in FIG. 5, and thus seal 36 would be in groove 30 and seal 38 in groove 32. Each of the seals have triangular cut-out regions 39a and 39b which fit around triangular non-groove regions 33a and 33b. The seals are constructed of a flexible and resilient material, like rubber (or closely machined metal), and are generally circular in cross section and dimensioned to approximately protrude 0.004 to 0.020 inch (varying with the size of valve) above planar surfaces (planar surface 26 of body member 12, and planar surface 28 of body member 14) of a body member. Planar surface 28 of body member 14 is coincident with the plane of joinder 40 between body members 12 and 14. However, planar surface 26 of body member 12 has recessed area 42 below the plane of joinder, and thus when the body members are joined, there is provided a cavity in which valve operating blade 44 is movable to effect a selected opening and closing of the valve.

Blade 44 (FIG. 6) is generally rectangular and elongated in shape and includes an opening 46 which, when the blade is operated to one extreme longitudinal position, aligns with openings 22 and 24; and when in an opposite extreme longitudinal position, opening 46 is positioned in a centered position with respect to "o" sections 48 of seals 36 and 38 in their respective positions in grooves 30 and 32 (as shown in FIG. 5), which surround solid surfaces 50 and 52 of body members 12 and 14. In the embodiment shown, travel limits for blade 44 are effected by tab 54 which extends perpendicularly from edge 56 of blade 44 and engages stops 58 and 60. Stops 58 and 60 are above the plane of recess 42, upon which blade 44 and tab 54 slide. To enable convenient manual operation of blade 44, tabs 62 and 64 are formed on opposite ends of blade 44.

Significantly, the valve of this invention includes an extremely compact and simply constructed assembly for fluid or hydraulic operation of the valve, thus readily enabling its remote control. This assembly consists of a pair of identically spaced, opposed, and in-line cylinders 66 and 68 and a piston 70 which operates in and between the cylinders, being slidably sealed by O rings 71 near its opposite end regions. A central radial opening 72 in piston 70 fits over tab 54 of blade 44 and provides a simple but effective drive coupling for blade 44. Cylinders 66 and 68 contain locking grooves 74 and 76 which are held by mating locking ridges 78, 79, 80, and 81 of cylindrical cavities 82 and 84 of body members 12 and 14 of the valve. Thus, groove 74 on cylinder 66 is held by locking ridges 78 and 79 of cylindrical cavities 82 and 84, respectively, and groove 76 of cylinder 68 is held by locking ridges 80 and 81 of cylindrical cavities 82 and 84, respectively. End 86 of cylinder 66 is open and has an internal thread 88 which enables it to be fastened by a source of fluid pressure, whereby piston 70 may be movable to move the blade to a closed position, whereby opening 46 is aligned with O seal sections 48. Cylinder 68 has an open end 90 with internal thread 92 by which cylinder 68 is connectable to a source of fluid power which moves piston 70, causing blade 44 to assume an open position, whereby opening 46 is aligned with openings 22 and 24, allowing liquid to pass between them. While cylinders 66 and 68 are axially locked by ridges in cylindrical cavities 82 and 84, the cylinders may be rotated via wrench engagement flats 94 to enable a screw connection to a pipe, thereby eliminating the need for pipe unions.

FIGS. 7 and 8 illustrate an embodiment of the invention wherein one of the body members, body member 96, is modified and adapted to function as a spray nozzle. The other body member, body member 98, is generally similar (there is one exception, which will be discussed below) to that of body member 14 illustrated in FIGS. 1, 2, 3, and 5. To the extent of like components, components of body member 98 retain identical reference numerals to those of body member 14.

Examining valve body member 96, it will be noted that it has a conical discharge opening 100, it being centered with respect to opening 24, which functions as an inlet opening. A deflector 102, illustrated in an enlarged pictorial view in FIG. 8, is formed of a sheet material, such as stainless steel, and rigidly attached to body member 96 by inserting end 103 of the deflector in slit 104 and securing it in place by set screw 106. Set screw 106 has a tapered end (not shown) which fits within opening 110 of deflector 102 to apply both a holding and positioning force on the deflector. Lower portion 112 of deflector 102 is generally curved to intercept the flow from conical discharge opening 110 and is convoluted and fan-shaped to effect a wide sheet-like spray of fluid. Where desired, the opening in blade 44 may be made of a particular diameter to thereby effectively meter the flow of liquid.

FIGS. 7 and 9 also illustrate an alternate means of fastening the body members together which may also be employed with the plain valve embodiment of the invention. Thus, instead of the body members being simply bolted as shown in FIG. 1, body member 96 has a tapered edge 114 and, mating with it, body member 98 has a tapered edge 114 and, mating with it, body member 98 has an overhanging groove 116. This combination provides for fastening on one side of the valve, and on the opposite side of the valve a quick release bolt arrangement is employed. Thus, as shown, body member 96 has a slotted opening 118 which is adapted to receive a bolt 120, held in place by wing nut 122. An opposite end of bolt 120 is held by body member 98 by means of bolt hole 124 (actually, both body members may be slotted). The head 126 of bolt 120 is enlarged so that it can be conveniently gripped to enable the valve to be readily assembled and disassembled by hand.

FIG. 10 illustrates a modification of the attachment arrangement shown in FIGS. 7 and 9. Instead of a tapered edge 114, a pin 126 is held between two spaced arms 128 and 130 on body member 132. Pin 126 is spaced from the latter; and instead of overhanging groove 116, a tongue 134 attached to body member 136 (otherwise identical to body member 98, shown in FIG. 7) is employed, and it locks under pin 126 as shown.

From the foregoing, it will be appreciated that this invention makes a significant contribution to the valve art. It provides for the manufacture of a valve which is extremely compact, can be disassembled in seconds, and can be manufactured at significantly less cost than other valves of the same capacity. Valve action is positive and provides excellent protection against leakage. In addition, each time the valve is operated to an "off" position, the orifice of the valve is wiped clean to thus preserve the size of the orifice and to thereby remove material which might otherwise interfere with valve closure. Further, the valve provides built-in means for its hydraulic operation, but it still can be operated manually. Valve seals are readily replaceable, and significantly, in view of the figure 8 form, each seal has four positions in which it may be employed, enabling an extremely long life. Still further, the cylinders which effect hydraulic operation are rotably attached to the valve body, and thus may be employed in the same fashion as a pipe union. Still further, since the valve is formed of separable input and output body members, it is possible to connect each side independently to piping, and then interconnect the two sides of the valve together, thus enabling its insertion in an existing line without a union.

Having thus described my invention, what is claimed is:

1. A valve comprising:
   a valve body;
   an elongated blade having opposite, generally flat, surfaces, and a discrete opening between said surfaces being positioned at a selected location along said blade;
   a fluid inlet in said valve body;
   a first flat surface in said valve body;
   guide means for enabling said blade to move along said first flat surface in a predetermined path;

a groove in said first flat surface having a generally oval-shaped exterior edge, and a pair of generally o-shaped interior groove regions separated in part by the absence of a groove;

a first opening in said first flat surface interior of one of the "o" regions, and said opening extending through said first flat surface to said fluid inlet;

a fluid outlet in said valve body;

a second flat surface in said valve body positioned opposite said first flat surface, and between which said flat surfaces said blade is movably positioned;

an essentially figure 8-shaped groove in said second flat surface and aligned with and facing said figure 8 groove in said first flat surface;

a second opening in said second flat surface interior of one of the "o" regions, which second opening is opoosite said first opening, and said second opening extends through said second surface and connects to said fluid outlet;

first and second seals, each configured with an oval-shaped outer edge and a pair of spaced o-shaped regions and an open region between o-shaped regions to accommodate said non-groove regions, and thus each being adapted to fit within a said groove of one of said flat surfaces, and wherein at least one of the "o" regions of each seal has an opening through it; and said blade being positionable and being engaged by and between said seal;

whereby the movement of said blade to a first position wherein the opening in said blade aligns with said first and second openings enables flow through said valve, and when said blade is moved in a position wherein the opening of said blade conforms to a position between "o's" in said seals wherein there is no such openings.

2. A valve as set forth in claim 1 wherein said valve body includes means for limiting the travel of said blade between a first blade position wherein said opening in said blade is essentially aligned with and between one set of oppositely positioned "o's" of said seals, and a second blade position wherein said opening in said blade is positioned essentially in line with and between the other set of oppositely positioned "o's" of said seals.

3. A valve as set forth in claim 2 wherein said blade extends beyond said valve body and includes means on each end of said blade for manually operating said blade longitudinally along its travel.

4. A valve as set forth in claim 2 which further comprises:

a pair of spaced in-line cylinders supported by said valve body;

a piston member being positioned in line with, between, and having piston end regions sealably extending into said cylinders; and coupling means for interconnecting said piston member and said blade;

whereby with a fluid force applied to one of said cylinders, said blade is moved to a first blade position, and with a fluid applied to the other of said cylinders, said blade is moved to said second blade position.

5. A valve as set forth in claim 4 wherein said cylinders are rotably supported by said valve body, and outer ends of said cylinders have threaded fluid couplings.

6. A valve as set forth in claim 4 wherein said blade extends beyond said valve body and includes means on each end of said blade for manually operating said blade longitudinally along its travel.

7. A valve as set forth in claim 4 wherein said valve body comprises:

a first separate body member comprising said fluid inlet and said first flat surface;

a second separate body member comprising said fluid outlet and said second flat surface;

one of said separate body members includes said guide means; and means for securing said first and second body members together.

8. A valve as set forth in claim 7 wherein:

said fluid outlet comprises a conically-shaped passageway extending from adjacent to said blade and having its maximum diameter at an outer surface of said valve body; and a fluid deflector attached to said second body member and to the side of said fluid outlet and extending in a curved path away from and across a geometric conical extension of said conical outlet, whereby fluid exhausted from said conical outlet is dispersed.

9. A valve as set forth in claim 7 wherein said means for securing said first and second body members together comprises:

first attachment means on one side of said valve body comprising an overhanging groove on one side of said first body and a mating tapered edge on an adjacent side of said second body member; and second attachment means positioned on the other side of said valve body and comprising:

a bolt hole in one of said body members, a slotted hole in the other of said body members, and a bolt extending through said bolt hole and said slotted hole and a wing nut on said bolt;

whereby said first and second body members may be readily assembled and disassembled by operation of said wing nut.

* * * * *